US009948546B2

(12) United States Patent
Kim et al.

(10) Patent No.: US 9,948,546 B2
(45) Date of Patent: Apr. 17, 2018

(54) EFFICIENT AUTO DETECTION FOR NEXT GENERATION WLAN

(71) Applicant: Apple Inc., Cupertino, CA (US)

(72) Inventors: Joonsuk Kim, Saratoga, CA (US); Syed Aon Mujtaba, Santa Clara, CA (US); Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 15/228,839

(22) Filed: Aug. 4, 2016

(65) Prior Publication Data
US 2017/0063670 A1 Mar. 2, 2017

Related U.S. Application Data (60) Provisional application No. 62/211,653, filed on Aug. 28, 2015.

(51) Int. Cl.
| | |
|---|---|
| *G01R 31/08* | (2006.01) |
| *H04L 5/14* | (2006.01) |
| *H04B 7/00* | (2006.01) |
| *H04J 3/00* | (2006.01) |
| *H04L 12/721* | (2013.01) |
| *H04L 27/26* | (2006.01) |
| *H04W 84/12* | (2009.01) |

(52) U.S. Cl.
CPC .......... *H04L 45/26* (2013.01); *H04L 27/2613* (2013.01); *H04L 27/2666* (2013.01); *H04W 84/12* (2013.01)

(58) Field of Classification Search
CPC . H04L 27/2633; H04L 27/2634; H04L 45/38; H04L 45/502; H04L 47/2483
See application file for complete search history.

(56) References Cited

U.S. PATENT DOCUMENTS

| | | | |
|---|---|---|---|
| 9,712,358 B2 * | 7/2017 | Zhang | ................. H04W 52/286 |
| 2005/0180361 A1 | 8/2005 | Hansen et al. | |

(Continued)

FOREIGN PATENT DOCUMENTS

WO    WO2016009278 A2    1/2016

*Primary Examiner* — Faruk Hamza
*Assistant Examiner* — Abu-Sayeed Haque
(74) *Attorney, Agent, or Firm* — Meyertons Hood Kivlin Kowert & Goetzel, P.C.; Jeffrey C. Hood; Matthew C. Washburn (57) ABSTRACT

An auto-detection scheme may be applied to a physical layer (PHY) preamble of a communications packet, such as an 802.11 packet, to identify which generation of a communication standard was used to generate the packet. A packet of a wireless transmission may be received by a wireless device. The packet may include a PHY preamble, including a first field, such as a legacy long training field (L-LTF), and a second, subsequent field, such as a non-legacy Signal field. The wireless device may determine that the first field is encoded using a Fast-Fourier Transform (FFT) of a first size, and that the second field is encoded using a FFT of a second, different size. This determining may identify a generation of the communication standard used to generate the packet. In response to the determining, the wireless device may decode the packet according to the identified generation of the communication standard.

17 Claims, 5 Drawing Sheets

(56) References Cited

U.S. PATENT DOCUMENTS

| | | | |
|---|---|---|---|
| 2007/0232344 A1* | 10/2007 | Aoki | H04B 7/0874 455/522 |
| 2011/0032875 A1* | 2/2011 | Erceg | H04B 7/0452 370/328 |
| 2012/0195391 A1* | 8/2012 | Zhang | H04L 5/0048 375/295 |
| 2013/0121348 A1 | 5/2013 | Zhang et al. | |
| 2013/0136157 A1* | 5/2013 | Son | H04L 5/0023 375/219 |
| 2015/0117433 A1* | 4/2015 | Zhang | H04L 69/22 370/338 |
| 2015/0146653 A1* | 5/2015 | Zhang | H04L 5/0041 370/329 |
| 2015/0312907 A1* | 10/2015 | Lee | H04L 27/2085 370/338 |
| 2016/0072654 A1 | 3/2016 | Choi et al. | |
| 2016/0119452 A1 | 4/2016 | Lee | |

\* cited by examiner

EFFICIENT AUTO DETECTION FOR NEXT GENERATION WLAN

PRIORITY INFORMATION

This application claims priority to U.S. provisional patent application Ser. No. 62/211,653, entitled "Efficient Auto-Detection for Next Generation WLAN," by Joonsuk Kim, et al., filed Aug. 28, 2015, which is hereby incorporated by reference in its entirety as though fully and completely set forth herein.

FIELD

The present disclosure relates to wireless communication, including to techniques for auto-detecting generational compatibility of signals in systems such as IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Many wireless communication standards, such as the IEEE 802.11 standards are being upgraded generationally, at least partly in order to improve throughput efficiency. In order to differentiate between signals of each generation, an auto-detection scheme may be used, e.g., in a packet's preamble, to indicate which generation of the standard was used to generate the packet. Various schemes have been introduced in the past, but the known schemes would reduce throughput efficiency for new-generation standards. Therefore, improvements in this area are desirable.

SUMMARY

This document describes, inter alia, methods for auto-detection of a standards generation of a wireless communication, such as an IEEE 802.11 (Wi-Fi) wireless communication, and describes apparatuses configured to implement the described methods.

In some embodiments, an auto-detection scheme may be applied to a physical layer (PHY) preamble of a communications packet, such as an 802.11 packet, to identify which generation of a communication standard was used to generate the packet. A packet of a wireless transmission may be received by a wireless device. The packet may include a PHY preamble, including a first field, such as a legacy long training field (L-LTF), and a second, subsequent field, such as a non-legacy Signal field. The wireless device may determine that the first field is encoded using a Fast-Fourier Transform (FFT) of a first size, and that the second field is encoded using a FFT of a second, different size. This determining may identify a generation of the communication standard used to generate the packet. In response to the determining, the wireless device may decode the packet according to the identified generation of the communication standard.

In some embodiments, a second packet may be received, having a PHY preamble including a third field, such as a L-LTF, and a fourth, subsequent field, such as a non-legacy Signal field. The wireless device may determine that both the third field and the fourth field are encoded using a FFT of the first size. Based at least partly on the determining, the wireless device may decode the packet according to a different generation of the communication standard.

In some embodiments, the wireless device may determine that the second field is encoded using a FFT of the second size by decoding the second field using an Inverse Fast-Fourier Transform (IFFT) of the first size; and determining that a data validity check including data from the second field decoded using the IFFT of the first size indicates an error.

In some embodiments, the wireless device may determine that the second field is encoded using a FFT of the second size by decoding the second field using an Inverse Fast-Fourier Transform (IFFT) of the second size; and determining that a data validity check including data from the second field decoded using the IFFT of the second size does not indicate an error.

In some embodiments, the FFT of the second size may be larger than the FFT of the first size. The wireless device may estimate, using training information included in the first field, a communication channel through which the wireless transmission is received. A number of channel estimation points resulting from the estimating may be a function of the size of the FFT with which the first field is encoded. Therefore, the wireless device may interpolate additional channel estimation points for decoding the second field with the FFT of the second size.

Also disclosed is a non-transitory computer-readable medium storing software instructions executable by a processor of a wireless communication device, the software instructions configured to cause the wireless communication device to perform steps similar to those outlined above.

Also disclosed is a wireless communication device comprising at least one processor, a memory storing software instructions executable by the at least one processor, and wireless communication circuitry communicatively coupled to the at least one processor. The wireless communication device may be configured to receive a packet of a wireless transmission, the packet comprising a PHY preamble comprising a first field and a second, subsequent field. The wireless communication device may determine whether the first field and the second field are encoded using FFTs of the same size. In response to determining that the first field and the second field are encoded using FFTs of the same size, the wireless communication device may decode the packet according to a first generation of a communication standard. In response to determining that the first field and the second filed are not encoded using FFTs of the same size, the wireless communication device may instead decode the packet according to a second, different generation of the communication standard.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—any of various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
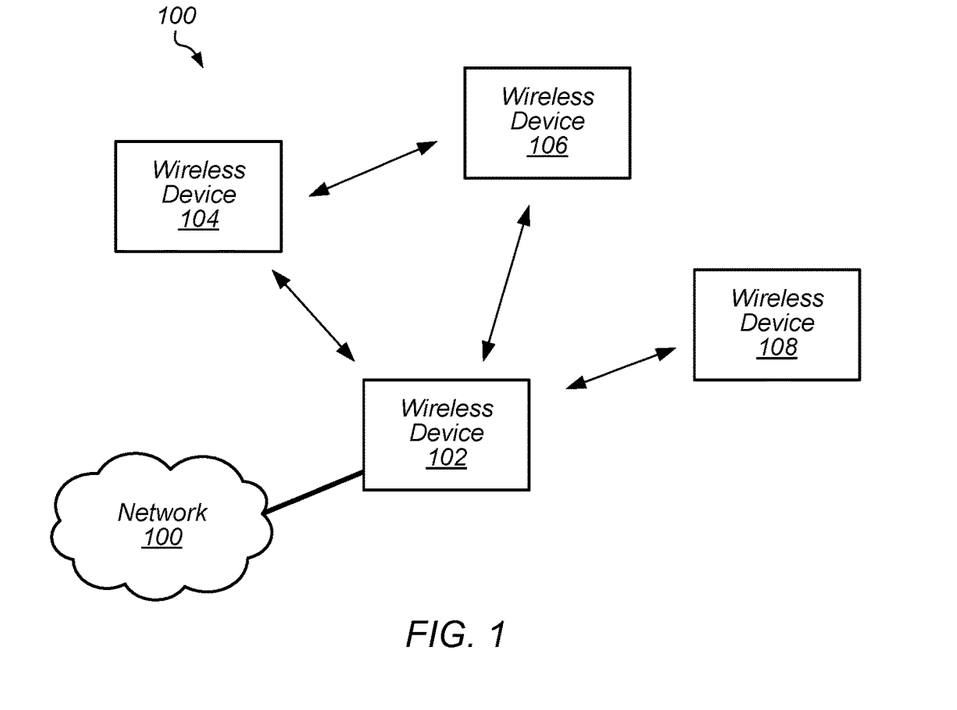
FIGS. 1-2 illustrate exemplary (and simplified) wireless communication systems, according to some embodiments.
Figure 2:
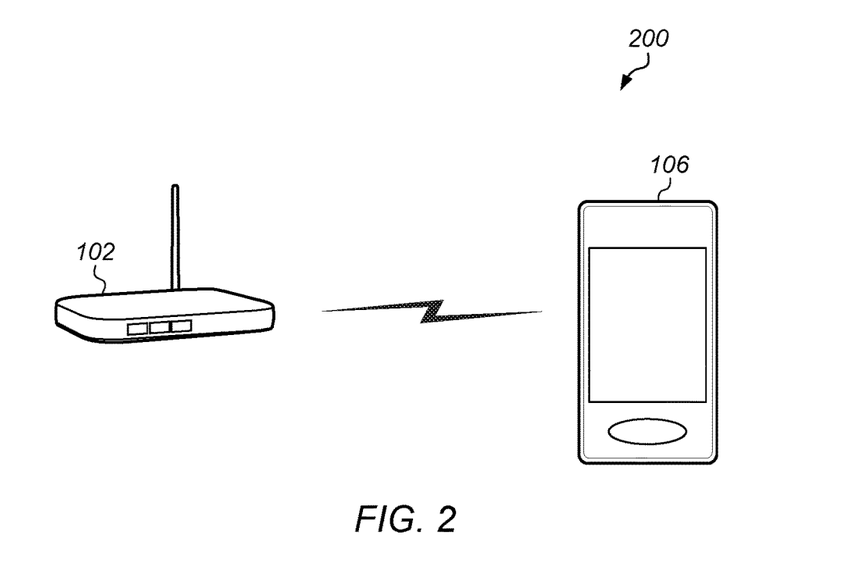

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform generational auto-detection in wireless communication according to aspects of the present disclosure.

One or more of the wireless devices may be equipped to communicate with one or more external networks. For example, as shown, wireless device 102 may be communicatively coupled to network 100. The external network(s) may be any of a variety of types of networks, such as a cellular service provider's core network (e.g., via a cellular base station), the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS) (e.g., GPS, GLONASS, or COMPASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of wireless devices 102-108 may be configured to perform any of the method embodiments described herein, or any portion of any of the method embodiments described herein, for example to include auto-detection of a generation of a communication standard used to generate a packet received by any of the wireless devices 102-108.

FIG. 2 illustrates an exemplary wireless communication system 200 in which aspects of the system 100 of FIG. 1 are represented, according to some embodiments. As shown in the illustrated system, wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a wearable device, a computer or a tablet, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
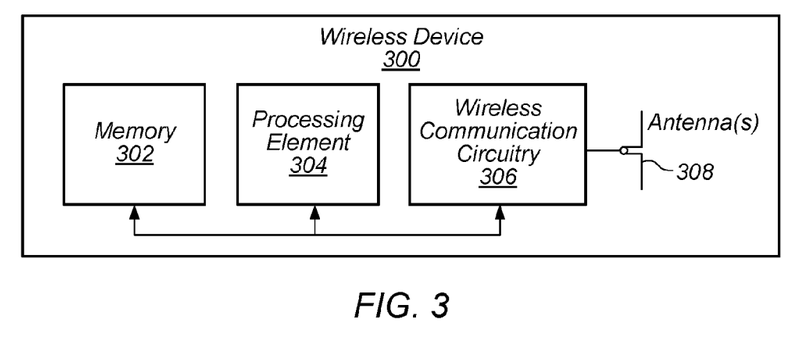
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300, which may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, a wearable device, etc. Alternatively, the device 300 may be a substantially stationary device, such as a television, a subwoofer, speaker, or other audio rendering device, a wireless access point, a set-top box, etc. The device 300 may be, or be included within, any of the wireless devices 102-108.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that, if desired, the wireless communication circuitry 306 may include a discrete processing element in addition to processing element 304; for example, processing element 304 may be an 'application processor' while wireless communication circuitry 306 may include its own 'baseband processor'. The wireless communication circuitry 306 may also include a discrete memory element in addition to the memory 302. The discrete memory element of the wireless communication circuitry 306 may include any of a variety of types of memory, and may, for example, store firmware or other software for execution by the discrete processing element of the wireless communication circuitry 306 (e.g., for execution by a baseband processor). Alternatively, or in addition, processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for auto-detection of a generation of a communication standard used to generate a packet received by the wireless device 300.

Figure 4:
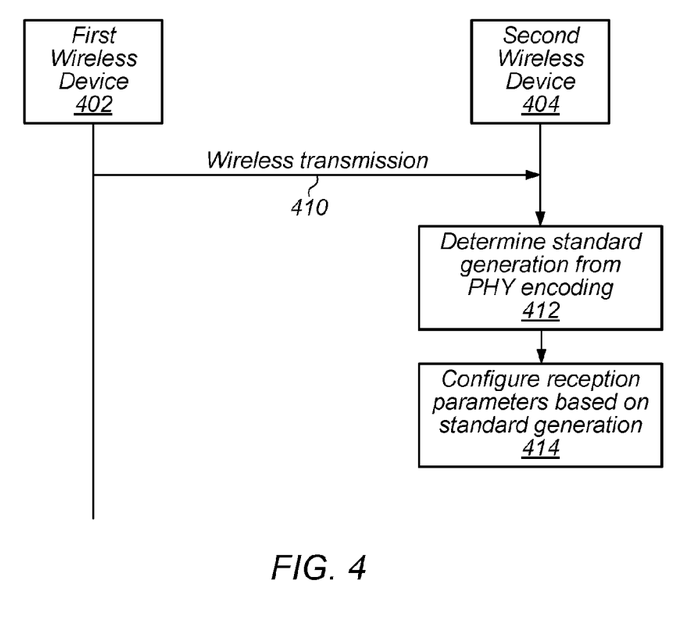
FIG. 4 is a signal flow diagram illustrating aspects of an exemplary method for wireless communication including an early indication of an applicable standards generation, according to some embodiments.

FIG. 4—Communication Flow Diagrams

FIG. 4 is a communication/signal flow diagram illustrating a scheme that may be used for performing wireless communication in a wireless communication system, such as an IEEE 802.11 wireless communication system, according to some embodiments. The scheme may be used to provide an indication of a generation of a communication standard used to encode a wireless transmission, by way of a physical layer (PHY) preamble. This may allow the receiving device to properly decode the wireless transmission according to the indicated generation of the standard (e.g., according to a communication protocol associated with the indicated generation of the standard).

The method shown in FIG. 4 may be used in conjunction with any of the computer systems or devices shown in the above Figures, among other devices. Some of the method elements shown may be performed concurrently, in a different order than shown, or may be omitted. Additional method elements may also be performed as desired. As shown, the methods may operate as follows.

A first wireless device 402 may perform a wireless transmission 410 (a "first wireless transmission"). The first wireless transmission may be performed according to any of a variety of wireless communication technologies and/or standards, as desired. As one specific possibility, the first wireless transmission may be an IEEE 802.11 (Wi-Fi) transmission.

The first wireless transmission 410 may include a PHY preamble and signaling information, as well as PHY data. The PHY data may include encapsulated higher layer data for any of various possible networking, application, and/or other protocol stack layers, for example, depending on the communication standard(s) and/or technologies in conjunction with which the first wireless transmission is being performed.

The PHY preamble and signaling information may facilitate carrier sensing and physical layer reception and decoding of the first wireless transmission by devices capable of receiving the first wireless transmission, and may include portions for any of various desired functions. For example, the PHY preamble and signaling information may include portions configured for any or all of signal/packet detection, gain control (e.g., automatic gain control (AGC)), coarse and/or fine frequency offset estimation and correction, coarse and/or fine timing estimation, channel estimation, modulation scheme and/or coding rate information, transmission length, transmission destination(s), and/or any of various other information. In particular, in an example case in which the first wireless transmission 410 is a Wi-Fi transmission, the PHY preamble may include any or all of a legacy short training field (L-STF), a legacy long training field (L-LTF), a legacy signal field (L-SIG), one or more 'high throughput' (HT) and/or 'very high throughput' (VHT) short training fields, long training fields, and/or signal fields, depending on the version (e.g., 802.11n, 802.11ac, etc.) of the Wi-Fi transmission.

As shown, at least a portion of the first wireless transmission 410 may be received by a second wireless device 404. In 412, the second wireless device 404 may determine a generation of the communication standard used to encode the wireless transmission 410 from the processing configuration of one or more fields of the PHY preamble, such as one or more SIG fields. For example, the second wireless device 404 may determine the standard generation of the wireless transmission 410 based on the modulation (e.g., BPSK or QBPSK) applied to the one or more fields of the PHY preamble, and/or based on the FFT size (e.g., 64/128/256/512) applied to the one or more fields of the PHY preamble. In some embodiments, the wireless transmission 410 may be an 802.11 transmission, and the generation determined may be any of 802.11a, 802.11g, 802.11n, 802.11ac, 802.11ax, etc.

Based on the standard generation determined in 412, the second wireless device 404 may (if it is the intended destination of the first wireless transmission 410) configure itself for reception of the first wireless transmission 410. This may include adjusting receiver hardware in accordance with the signaled parameters of the first wireless transmission 410 according to the determined generation of the standard.

FIGS. 5-8—Exemplary 802.11 Packet Structures

FIGS. 5-8 and the information provided herein below in conjunction therewith are provided by way of example of various considerations and details relating to possible IEEE 802.11 wireless communication systems in which the method of FIG. 4 may be implemented, according to some embodiments, and are not intended to be limiting to the disclosure as a whole. Numerous variations and alternatives to the details provided herein below are possible and should be considered within the scope of the disclosure.

With each new generation of 802.11 (802.11, 802.11a, 802.11b, 802.11g, 802.11n, 802.11ac), backward compatibility has been addressed. Where the generations share frequency space, consideration has been given to how a later-generation signal will be handled when received by an earlier-generation receiver. Specifically, it may be desirable that the earlier-generation receiver recognize early (e.g., while receiving the PHY preamble) that the received signal is not configured according to a generation of the standard known by the receiver.

For example, the original-generation 802.11 standard utilized Direct-Sequence Spread Spectrum (DSSS) encoding with a long preamble (using 128 SYNC bits). By contrast, 802.11b added an optional short preamble (using 56 SYNC bits) for Complementary Code Keying (CCK) operation for higher data rates within the same frequency space, thereby distinguishing the higher data-rate signals from the original-generation signals.

802.11a distinguished from these generations by using OFDM, and by beginning the preamble with the STF (Short Training Field), followed by the LTF (Long Training Field) and then the Signal field, operating in the 5 GHz frequency band. 802.11g applied a similar preamble, but operated in the 2.4 GHz band, so no additional distinction was needed to avoid confusion between the two standards.

With the introduction of 802.11n, however, backward-compatibility with 802.11a and 802.11g became a concern, as the legacy STF, LTF, and Signal fields were preserved in the preamble (as L-STF, L-LTF, and L-SIG fields), with 802.11n operating in both the 2.4 GHz and 5 GHz bands.

Figures 5, 6:
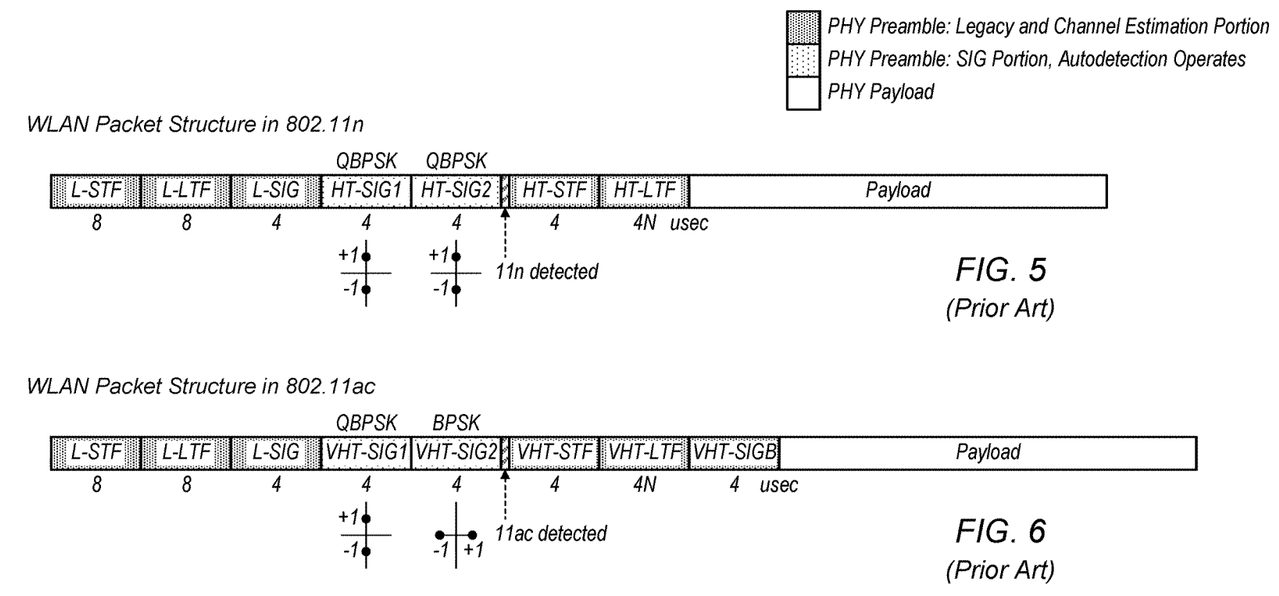
FIGS. 5-8 illustrate exemplary implementation details of possible systems implementing aspects of the method of FIG. 4 in which a standards generation is identified in a Wi-Fi transmission, according to some embodiments.

FIG. 5 illustrates a packet structure according to 802.11n. Each of the L-STF and L-LTF fields are 8 μs in length. The legacy signal (L-SIG) field is 4 μs in length. The L-SIG field is modulated with BPSK. To distinguish 802.11n, the HT-SIG1 and HT-SIG2 fields (sometimes referred to cumulatively as HT-SIGA or individually as HT-SIGA1 and HT-SIGA2), each being 4 μs in length, are modulated with QBPSK; i.e., the modulation constellation of the BPSK is rotated 90 degrees. Thus, a previous-generation receiver (e.g., an 802.11a/g receiver) attempting to decode an 802.11n preamble would fail upon reaching the HT-SIG1 field, and would drop the received packet, as desired. Similarly, an 802.11n receiver may distinguish between a received previous-generation (e.g., 802.11a/g) signal and an 802.11n signal, and may decode the signal according to the correct generation of the standard.

FIG. 6 illustrates a packet structure according to 802.11ac. Again, the L-STF, L-LTF, and L-SIG fields are preserved. However, the HT-SIG1 and HT-SIG2 fields have been replaced with the VHT-SIG1 and VHT-SIG2 fields (sometimes referred to cumulatively as VHT-SIGA or individually as VHT-SIGA1 and VHT-SIGA2), each being 4 μs in length. The VHT-SIG1 field is modulated with QBPSK. Thus, an 802.11a/g receiver attempting to decode an 802.11ac preamble would fail upon reaching the VHT-SIG1 field, and would drop the received packet, just as with an 802.11n packet. However, the VHT-SIG2 field is modulated with BPSK, distinguishing from the QBPSK modulation of the HT-SIG2 field of an 802.11n preamble. Thus, an 802.11n receiver attempting to decode an 802.11ac preamble would fail upon reaching the VHT-SIG2 field, and would drop the received packet. Similarly, an 802.11 ac receiver may distinguish between a received 802.11a/g signal (based on the absence of a QBPSK SIG1 field), a received 802.11n signal (based on the presence of QBPSK SIG1 and SIG2 fields) and an 802.11ac signal (based on the presence of a QBPSK SIG1 field and a BPSK SIG2 field), and may decode the signal according to the correct generation of the standard.

Figure 7:
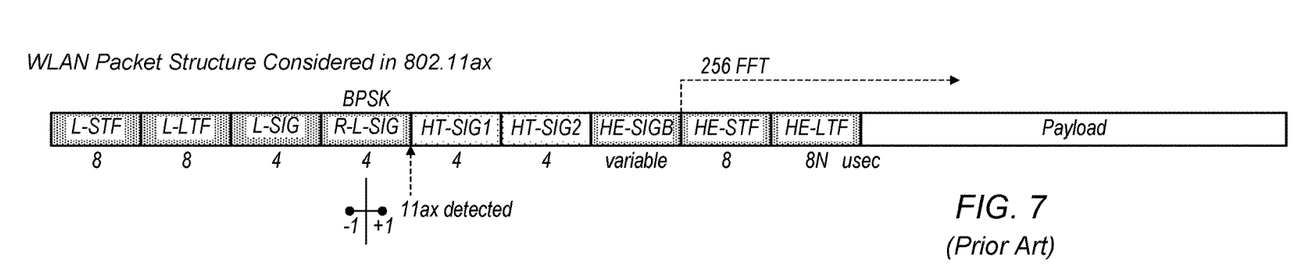

FIG. 7 illustrates a proposed packet structure according to a next-generation 802.11 standard (e.g., 802.11ax). Again, the L-STF, L-LTF, and L-SIG fields are preserved. However, according to the illustration of FIG. 7, following the L-SIG field, the same L-SIG field is repeated (R-L-SIG). Thus a previous-generation receiver attempting to decode a proposed 802.11ax preamble according to the illustration of FIG. 7 would recognize that the preamble is not an 802.11a/g preamble upon reaching the unexpected R-L-SIG field. If the receiver is an 802.11a/g receiver, it would thus drop the received packet. Further, like the first L-SIG field, the R-L-SIG filed is modulated with BPSK. Thus, an 802.11n or 802.11ac receiver attempting to decode the preamble would further recognize that the preamble is not an 802.11n or 802.11ac preamble upon determining that the R-L-SIG field is modulated with BPSK, as opposed to the expected QBPSK of the HT-SIG1 or VHT-SIG1 fields. Thus, and 802.11n or 802.11ac receiver would also drop the packet. Similarly, an 802.11ax receiver could distinguish a next generation (e.g., 802.11ax) signal according to the proposed packet structure of FIG. 7 from a signal encoded according to any of the preceding generations discussed above, and may decode the received signal according to the correct generation of the standard.

However, the proposed packet structure of FIG. 7 sacrifices timing budget by introducing the 4 µs R-L-SIG field. Specifically, because the R-L-SIG field exactly repeats the L-SIG field, it provides no functionality other than identifying a next generation (e.g., 802.11ax) packet. On the other hand, it introduces a 4 µs delay in every next generation (e.g., 802.11ax) packet.

To avoid sacrificing timing budget, a next-generation 802.11 standard may be identified using FFT size. For example, rather than introducing a new preamble field (e.g., R-L-SIG) having an unexpected modulation, one or more preamble fields may have an unexpected FFT size. In some embodiments, this unexpected FFT size of the one or more preamble fields of a packet may be the only indication in the preamble of the generation of the packet.

Figure 8:
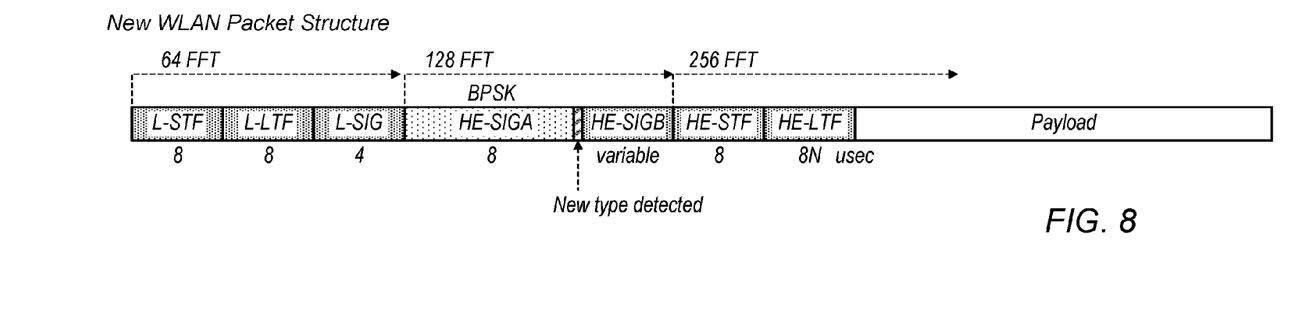

FIG. 8 illustrates an alternative packet structure for use with a next-generation 802.11 standard (e.g., 802.11ax). Again, the legacy L-STF, L-LTF, and L-SIG fields are preserved from previous-generation preambles. These legacy preamble fields may be encoded with a first FFT size. For example, as in previous generations, these legacy preamble fields may be encoded with a 64 point FFT. The L-SIG field may be followed by an HE-SIGA field. The HE-SIGA field may operate with a second, different FFT size. For example, the HE-SIGA field may be encoded with a 128 point FFT or 256 point FFT. Some or all of the subsequent fields, following the HE-SIGA field, may operate at a third FFT size. For example, the packet structure illustrated in FIG. 8 shows the HE-SIGA and HE-SIGB fields encoded with a 128 point FFT, and the remaining fields of the packet (i.e., beginning at the HE-STF field) encoded with a 256 point FFT.

In this example, a previous-generation receiver attempting to decode a proposed next-generation preamble according to the illustration of FIG. 8 would attempt to decode the HE-SIGA field using a 64 point FFT. As a result, the HE-SIGA field would appear scrambled. For example, the previous-generation receiver may determine that a data validity check, such as a cyclic redundancy check (CRC), including data from the HE-SIGA field indicates an error. Thus, the previous-generation receiver would recognize that the preamble is not a previous-generation preamble, and would drop the received packet.

Similarly, a next-generation receiver may, in some scenarios, first attempt to decode the received HE-SIGA field using a 64 point FFT. As a result, the HE-SIGA field would appear scrambled. For example, the next-generation receiver may determine that a CRC including data from the HE-SIGA field indicates an error. In response, the next-generation receiver may attempt to decode the received HE-SIGA field using the correct FFT size designated for the HE-SIGA field in the next-generation packet structure (e.g., 128 point FFT in the example of FIG. 8). As a result, the HE-SIGA field would be properly decoded, allowing the next-generation receiver to recognize the packet as a next-generation packet. For example, the next-generation receiver may determine that a CRC (or other data validity check) including data from the HE-SIGA field does not indicate an error (e.g., indicates no error or a sufficiently small error rate). Alternatively, if the next-generation receiver receives a previous-generation packet, the next-generation receiver may identify and decode the previous-generation packet using a 64 point FFT, according to the correct generation of the standard, as discussed above.

Increasing from 64 FFT to 128 FFT results in the OFDM size being doubled. Therefore, the HE-SIGA field may be 8 µs in length. This is equivalent to 4 µs for each of the HE-SIG1 field and the HE-SIG2 field proposed in FIG. 7.

Identifying the next-generation packet by the FFT size of one or more preamble fields obviates the addition of a 4 µs R-L-SIG field. Thus, 4 µs per packet may be saved relative to the proposed packet structure of FIG. 7. Additionally, little processing time and/or hardware complexity are introduced by this procedure. For example, many wireless devices implement an FFT using a Radix-2 algorithm. In such an algorithm, doubling the FFT size, e.g., from 64 points to 128 points, may include merely adding one additional stage of decimation (sometimes referred to as a radix stage or butterfly operation). Thus, little additional computational time is used to increase the FFT size. Furthermore, in an implementation of a wireless device equipped to encode the payload at a higher FFT size (e.g., 256 point FFT in the example of FIG. 8), any additional hardware complexity required for such larger FFT sizes would already be included, so that increasing the size of the FFT used to encode one or more preamble fields up to the FFT size used to encode the payload would not require any further increase in hardware complexity.

It may be noted that channel estimation may be performed based on training using the L-LTF, which may, in the present example, be encoded with a 64 point FFT, as noted above. Thus, the training may be performed based on 64 training tones for estimating the channel. However, if subsequent fields are decoded at a higher FFT size (e.g., if the HE-SIGA field and HE-SIGB field are decoded with a 128 point FFT, as in the example of FIG. 8) without first performing additional training, then additional points of channel estimation may be needed in order to accurately decode those subsequent fields. In such cases, the receiver may interpolate additional points of channel estimation.

Figure 9:
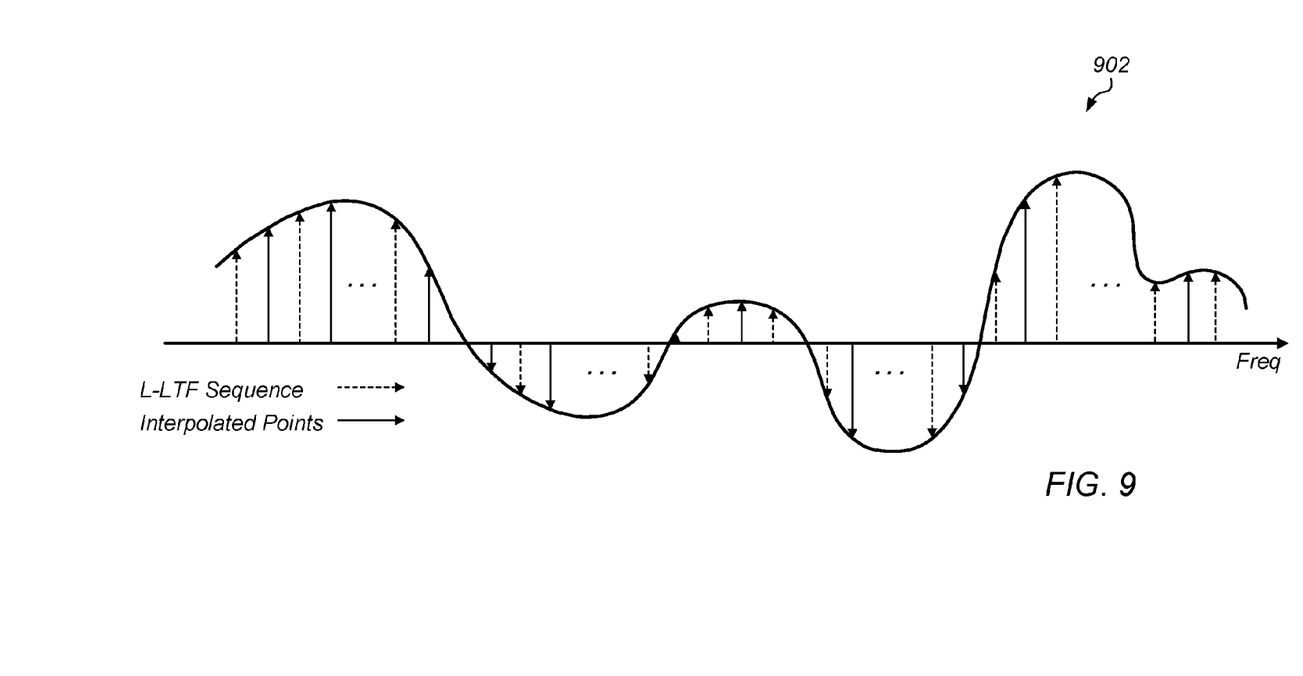
FIG. 9 illustrates an exemplary implementation of signal interpolation in a Wi-Fi transmission, according to some embodiments.

FIG. 9 illustrates an example of doubling the number of channel estimation points by interpolation, as in a case in which the L-LFT is decoded using a 64 point FFT and one or more subsequent fields are decoded using a 128 point FFT. Such interpolation may be performed, e.g., using a minimum mean-square error (MMSE) interpolator, or other interpolator known in the art. In the example of FIG. 9, a curve 902 illustrates an estimate of the communications channel through which the wireless transmission was received. Specifically, the curve 902 illustrates the magnitude response of the communications channel over a frequency range. Because, in this example, the size of the FFT has been doubled, odd points may be determined based on traditional channel estimation performed using the L-LTF, and even points may be determined by interpolation. It should be appreciated that additional points may be interpolated, e.g., if larger FFT sizes are used in decoding one or more preamble fields. However, increasing the amount of interpolation may result in a less accurate characterization of the channel, which may lead to an increase in error rate in decoding the received signal. The effectiveness of using interpolated channel estimation points may depend upon the selectivity of the channel, as well as they type of interpolator used. Channel smoothing and/or other techniques may be used to improve the channel estimation after interpolation.

Figure 10:
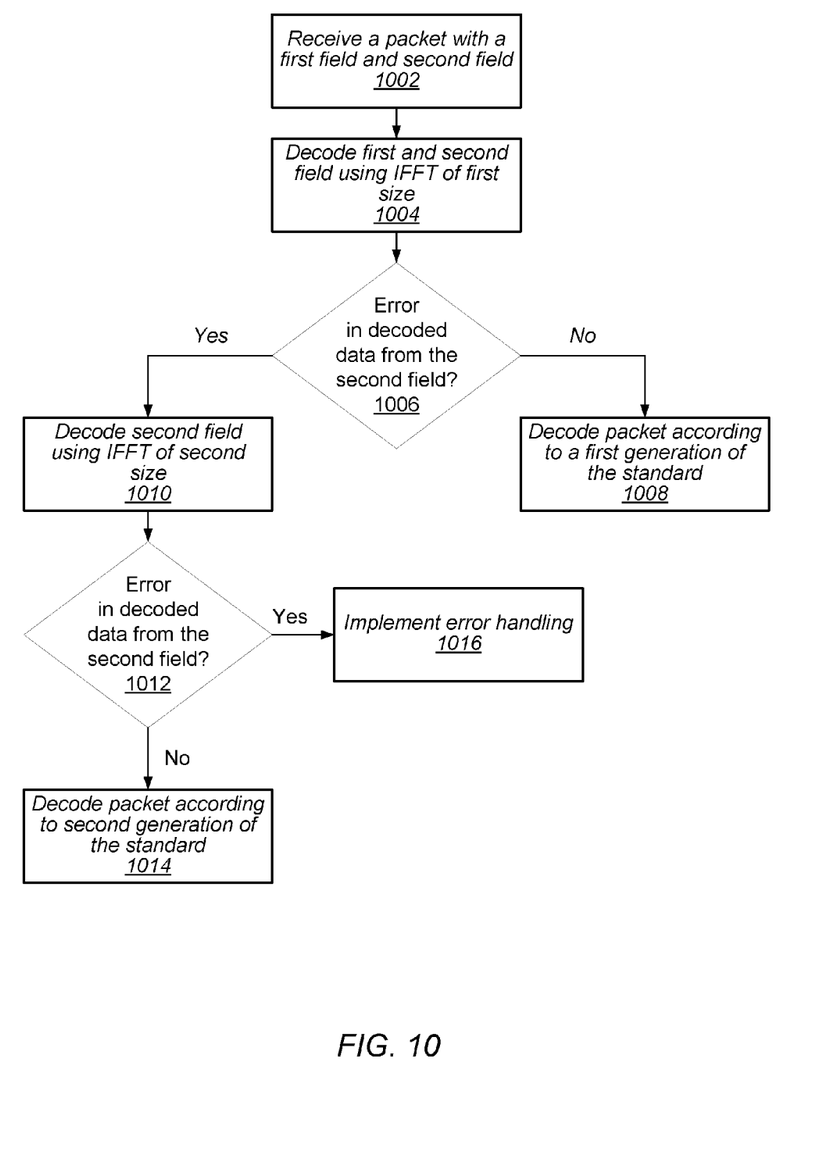
FIG. 10 is a flow chart illustrating a method of decoding a communication packet encoded according to a generation of a communication standard, according to some embodiments.

FIG. 10—Method of Decoding a Packet

FIG. 10 is a flow chart illustrating a method of decoding a communication packet encoded according to a generation of a communication standard, according to some embodiments. The steps of FIG. 10 may be performed by a wireless device, such as any of the wireless devices 102-104 or 300.

At 1002, the wireless device receives a packet of a wireless transmission including a PHY preamble. The PHY preamble may include a first field and a second field, among other fields. As one example, the first field may be, or include, a legacy field, such as a L-LTF, and the second packet may be, or include, a non-legacy Signal field.

In response to receiving the packet at 1002, the wireless device may determine whether the first field is encoded using a Fast-Fourier Transform (FFT) of a first size and the second field is encoded using a FFT of a second, different size. As illustrated in FIG. 10, this may be performed, e.g., by iteratively decoding the first and/or second fields using IFFTs of differing sizes.

Specifically, at 1004, the wireless device may decode the first field and the second field using an Inverse Fast-Fourier Transform (IFFT) of a first size. For example, the wireless device may decode the first and second fields using a 64-point IFFT. Then, at 1006, the wireless device may determine whether a data validity check (e.g., a CRC) including data from the second field decoded using the IFFT of the first size indicates an error (e.g., indicates no error or a sufficiently small error rate). In some scenarios, the data validity check (or a separate data validity check) may include data from the first field.

If, at 1006, the data validity check does not indicate an error, then the wireless device has determined that the first field and the second field are both encoded using a FFT of the first size. In response, the wireless device may, at 1008, decode the packet according to a first generation of a communication standard. For example, the second generation of the communication standard may be a legacy 802.11 standard. In some scenarios, decoding the packet according to the second generation of the communication standard may include performing additional steps to identify the first generation of the communication standard. For example, in a scenario in which the communication standard is the 802.11 standard, decoding the packet according to the first generation of the 802.11 standard may include determining modulation (e.g., BPSK or QBPSK) applied to the one or more fields of the PHY preamble to determine which legacy 802.11 standard was used to encode the packet, as discussed with regard to FIGS. 5-7. In any case, the first generation of the standard is characterized in that, according to the first generation of the standard, the first field and the second field are encoded using a FFT of the first size.

If, at 1006, the data validity check indicates an error, the wireless device may, at 1010, decode the second field using an IFFT of a second size. For example, the wireless device may decode the first and second fields using a 128-point IFFT or a 256-point IFFT. In some scenarios, this may include performing one or more additional stages of decimation on the output of the decoding of the second field using the IFFT of the first size at 1004. In other scenarios, this may include performing a new decoding of the second field using an IFFT of the second size.

Following the decoding of the second field using the IFFT of the second size, the wireless device may, at 1012, determine whether a data validity check including data from the second field decoded using the IFFT of the first size indicates an error. If, at 1012, the data validity check indicates that there is no error, then the wireless device has determined that the first field is encoded using a FFT of the first size, and the second field is encoded using a FFT of the second size. This determination may identify that the packet is encoded according to a second generation of the communication standard. For example, this determination may indicate that the packet is encoded according to the next-generation 802.11 standard. Thus, based on this determination, the wireless device may, at 1014, decode the packet according to the second generation of the communication standard (e.g., according to the next-generation 802.11 standard).

In some scenarios, decoding the packet according to the second generation of the communication standard at 1014 may include interpolating additional channel estimation points for decoding the second field and/or subsequent fields, as discussed in connection with FIG. 9.

If, at 1012, the data validity check indicates that there is an error, then the wireless device has determined that the packet is not encoded according to either the first generation of the standard or the second generation of the standard. In response, the wireless device may, at 1016, implement any of various error handling procedures as known in the art, such as requesting retransmission of the packet.

It should be understood that the steps illustrated in FIG. 10 are exemplary, and that various steps may be removed or reordered. For example, in some scenarios, the wireless device may routinely decode the second field using both the IFFT of the first size (as at 1004) and the IFFT of the second field (as at step 1010), e.g., by sampling various radix stages of an IFFT of at least the second size, before (or concurrent with) determining whether the data validity check including data from the second field decoded using the IFFT of the first size indicates an error (as at 1006). In some scenarios, the wireless device may determine whether the data validity check including data decoded using the IFFT of the second size indicates an error (as at 1012) before (or concurrent with) determining whether the data validity check including data decoded using the IFFT of the first size indicates an error (as at 1006).

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless communication device comprising: at least one processor; a memory storing software instructions executable by the at least one processor; wireless communication circuitry communicatively coupled to the at least one processor; wherein the wireless communication device is configured to: receive a packet of a wireless transmission, the packet comprising a physical layer (PHY) preamble comprising a first field and a second, subsequent field; determine whether the first field and the second field are encoded using Fast-Fourier Transforms (FFTs) of the same size; in response to determining that the first field and the second field are encoded using FFTs of the same size, decode the packet according to a first generation of a communication standard; and in response to determining that the first field and the second filed are not encoded using FFTs of the same size, decode the packet according to a second, different generation of the communication standard; wherein the wireless communication device is further configured to: in response to determining that the second field is encoded using a larger FFT than the first field: estimate, using training information comprised in the first field, a communication channel through which the wireless transmission is received, wherein a number of channel estimation points resulting from the estimating is a function of the size of the FFT with which the first field is encoded; and interpolate additional channel estimation points for decoding the second field.

2. The wireless communication device of claim 1, wherein the first field comprises a legacy long training field (L-LTF), and the second field comprises a non-legacy Signal field.

3. The wireless communication device of claim 1, wherein the communication standard is the 802.11 communication standard.

4. The wireless communication device of claim 1, wherein the determining whether the first field and the second field are encoded using FFTs of the same size comprises: decoding the first field and the second field using an Inverse Fast-Fourier Transform (IFFT) of a first size; and determining whether a data validity check including data from the first field and the second field decoded using the IFFT of the first size indicates an error.

5. The wireless communication device of claim 1, wherein the determining whether the first field and the second field are encoded using FFTs of the same size further comprises: decoding the first field using an IFFT of a first size and decoding the second field using an IFFT of a second size; and determining that a data validity check including data from the second field decoded using the IFFT of the second size does not indicate an error.

6. A method, comprising: by a wireless device: receiving a packet of a wireless transmission, wherein the packet comprises a physical layer (PHY) preamble, wherein the PHY preamble comprises a first field and a second, subsequent field; determining that the first field is encoded using a Fast-Fourier Transform (FFT) of a first size and the second field is encoded using a FFT of a second, different size; decoding the packet according to a particular generation of a communication standard, wherein the particular generation of the communication standard is identified based on the determining; wherein the FFT of the second size is larger than the FFT of the first size, the method further comprising: estimating, using training information comprised in the first field, a communication channel through which the wireless transmission is received, wherein a number of channel estimation points resulting from the estimating is a function of the size of the FFT with which the first field is encoded; interpolating additional channel estimation points for decoding the second field with the FFT of the second size.

7. The method of claim 6, further comprising: by the wireless device: receiving a second packet of a wireless transmission, wherein the second packet comprises a second PHY preamble, wherein the second PHY preamble comprises a third field and a fourth, subsequent field; determining that both the third field and the fourth field are encoded using a FFT of the first size; decoding the second packet according to a different generation of the communication standard, wherein the different generation of the communication standard is identified based at least partly on the determining that both the third field and the fourth field are encoded using a FFT of the first size.

8. The method of claim 7, wherein the first field and the third field each comprise a legacy long training field (L-LTF), and the second field and the fourth field each comprise a non-legacy Signal field.

9. The method of claim 6, wherein the communication standard is the 802.11 communication standard.

10. The method of claim 6, wherein the determining that the second field is encoded using a FFT of the second size comprises: decoding the second field using an Inverse Fast-Fourier Transform (IFFT) of the first size; and determining that a data validity check including data from the second field decoded using the IFFT of the first size indicates an error.

11. The method of claim 6, wherein the determining that the second field is encoded using a FFT of the second size further comprises: decoding the second field using an Inverse Fast-Fourier Transform (IFFT) of the second size; and determining that a data validity check including data from the second field decoded using the IFFT of the second size does not indicate an error.

12. A non-transitory computer-readable medium storing software instructions executable by a processor of a wireless communication device, the software instructions configured to cause the wireless communication device to: receive a packet of a wireless transmission, wherein the packet comprises a physical layer (PHY) preamble, wherein the PHY preamble comprises a first field and a second, subsequent field; determine that the first field is encoded using a Fast-Fourier Transform (FFT) of a first size and the second field is encoded using a FFT of a second, different size; decode the packet according to a particular generation of a communication standard, wherein the particular generation of the communication standard is identified based on the determining; wherein the FFT of the second size is larger than the FFT of the first size, wherein the software instructions are further configured to cause the wireless communication device to: estimate, using training information comprised in the first field, a communication channel through which the wireless transmission is received, wherein a number of channel estimation points resulting from the estimating is a function of the size of the FFT with which the first field is encoded; interpolate additional channel estimation points for decoding the second field with the FFT of the second size.

13. The non-transitory computer-readable medium of claim 12, wherein the software instructions are further configured to cause the wireless communication device to: receive a second packet of a wireless transmission, wherein the second packet comprises a second PHY preamble, wherein the second PHY preamble comprises a third field and a fourth, subsequent field; determine that both the third field and the fourth field are encoded using a FFT of the first size; decode the second packet according to a different generation of the communication standard, wherein the different generation of the communication standard is identified based at least partly on the determining that both the third field and the fourth field are encoded using a FFT of the first size.

14. The non-transitory computer-readable medium of claim 13, wherein the first field and the third field each comprise a legacy long training field (L-LTF), and the second field and the fourth field each comprise a non-legacy Signal field.

15. The non-transitory computer-readable medium of claim 12, wherein the communication standard is the 802.11 communication standard.

16. The non-transitory computer-readable medium of claim 12, wherein, in determining that the second field is encoded using a FFT of the second size, the software instructions are further configured to cause the wireless communication device to: decode the second field using an Inverse Fast-Fourier Transform (IFFT) of the first size; and determine that a data validity check including data from the second field decoded using the IFFT of the first size indicates an error.

17. The non-transitory computer-readable medium of claim 12, wherein, in determining that the second field is encoded using a FFT of the second size, the software instructions are further configured to cause the wireless communication device to: decoding the second field using an Inverse Fast-Fourier Transform (IFFT) of the second size; and determining that a data validity check including data from the second field decoded using the IFFT of the second size does not indicate an error.

* * * * *